United States Patent
Steel et al.

(10) Patent No.: US 11,879,323 B2
(45) Date of Patent: Jan. 23, 2024

(54) SYSTEMS AND METHODS FOR DETERMINING WELL CASING ECCENTRICITY

(71) Applicants: Pipelines 2 Data (P2D) Limited, Aberdeen (GB); ConocoPhillips Company, Houston, TX (US)

(72) Inventors: Geoff Steel, Aberdeen (GB); Mark Walsh, Aberdeen (GB); Stephen John Mayo, Aberdeen (GB)

(73) Assignees: CONOCOPHILLIPS COMPANY, Houston, TX (US); PIPELINES 2 DATA (P2D) LIMITED, Aberdeen (GB)

( * ) Notice: Subject to any disclaimer, the term of this patent is extended or adjusted under 35 U.S.C. 154(b) by 155 days.

(21) Appl. No.: 17/080,761

(22) Filed: Oct. 26, 2020

(65) Prior Publication Data

US 2021/0215034 A1 Jul. 15, 2021

Related U.S. Application Data

(60) Provisional application No. 63/094,258, filed on Oct. 20, 2020, provisional application No. 63/032,240, (Continued)

(51) Int. Cl.
*E21B 47/00* (2012.01)
*E21B 47/005* (2012.01)
(Continued)

(52) U.S. Cl.
CPC .......... *E21B 47/005* (2020.05); *E21B 47/085* (2020.05); *E21B 47/095* (2020.05);
(Continued)

(58) Field of Classification Search
CPC .... E21B 47/005; E21B 47/085; E21B 47/095; G01V 1/40; G01V 1/306
See application file for complete search history.

(56) References Cited

U.S. PATENT DOCUMENTS 4,658,383 A 4/1987 Zimmer
4,992,994 A 2/1991 Rambow et al.
(Continued)

FOREIGN PATENT DOCUMENTS

CA 3063567 A1 * 6/2020 ........... E21B 47/006
WO WO-2017210231 A1 12/2017
(Continued)

OTHER PUBLICATIONS

International Search Report and Written Opinion for International Application No. PCT/US2020/057334 dated Feb. 5, 2021, 8 pages.
(Continued)

*Primary Examiner* — John Fitzgerald
(74) *Attorney, Agent, or Firm* — Polsinelli PC

(57) ABSTRACT

Implementations described and claimed herein provide systems and methods for isolation detection. In one implementation, a radial acoustic log is obtained. The radial acoustic log is captured using a radial sensor of an acoustic logging tool deployed within a first structure. The first structure disposed within a second structure in a subterranean environment. A radial symmetry is determined using the radial acoustic log. An eccentricity of the first structure relative to the second structure is determined based on the radial symmetry.

18 Claims, 12 Drawing Sheets

Related U.S. Application Data filed on May 29, 2020, provisional application No. 62/926,228, filed on Oct. 25, 2019, provisional application No. 62/926,243, filed on Oct. 25, 2019.

(51) Int. Cl.
| | | |
|---|---|---|
| *G01V 1/28* | (2006.01) | |
| *G01V 1/30* | (2006.01) | |
| *G01V 1/40* | (2006.01) | |
| *E21B 47/085* | (2012.01) | |
| *E21B 47/095* | (2012.01) | |

(52) U.S. Cl.
CPC .............. *G01V 1/284* (2013.01); *G01V 1/306* (2013.01); *G01V 1/40* (2013.01); *E21B 2200/22* (2020.05)

(56) References Cited

U.S. PATENT DOCUMENTS

| | | | |
|---|---|---|---|
| 6,941,819 | B1 | 9/2005 | Maki, Jr. et al. |
| 9,494,705 | B2 | 11/2016 | Sinha |
| 10,222,501 | B2 | 3/2019 | Zhang et al. |
| 10,465,509 | B2* | 11/2019 | Yao .......................... E21B 47/09 |
| 11,542,810 | B2* | 1/2023 | Hallundbæk ............. E21B 4/18 |
| 2003/0151975 | A1 | 8/2003 | Zhou et al. |
| 2004/0001389 | A1 | 1/2004 | Tang |
| 2004/0216873 | A1* | 11/2004 | Frost, Jr. ................. E21B 47/00 166/250.11 |
| 2005/0205248 | A1 | 9/2005 | Barolak et al. |
| 2006/0119364 | A1 | 6/2006 | Chen et al. |
| 2010/0038079 | A1 | 2/2010 | Greenaway |
| 2010/0154531 | A1 | 6/2010 | Han et al. |
| 2010/0263449 | A1 | 10/2010 | Bolshakov et al. |
| 2011/0188347 | A1 | 8/2011 | Thiercelin et al. |
| 2011/0255370 | A1 | 10/2011 | Hirabayashi et al. |
| 2013/0098604 | A1 | 4/2013 | Ramakrishnan et al. |
| 2014/0177389 | A1 | 6/2014 | Bolshakov et al. |
| 2015/0198732 | A1 | 7/2015 | Zeroug et al. |
| 2015/0285607 | A1 | 10/2015 | Helmore |
| 2016/0109614 | A1 | 4/2016 | Wu et al. |
| 2016/0299050 | A1 | 10/2016 | Dorovsky et al. |
| 2017/0016305 | A1 | 1/2017 | Prieur et al. |
| 2017/0114626 | A1 | 4/2017 | Bardapurkar et al. |
| 2018/0003032 | A1 | 1/2018 | Donzier et al. |
| 2018/0003843 | A1 | 1/2018 | Hori et al. |
| 2018/0031723 | A1 | 2/2018 | Przebindowska et al. |
| 2018/0073353 | A1 | 3/2018 | Malik et al. |
| 2018/0100950 | A1* | 4/2018 | Yao .......................... E21B 47/085 |
| 2018/0149019 | A1 | 5/2018 | Bose et al. |
| 2018/0196157 | A1 | 7/2018 | Zeroug et al. |
| 2019/0101663 | A1 | 4/2019 | Walters et al. |
| 2019/0226319 | A1 | 7/2019 | Espe et al. |
| 2020/0049850 | A1 | 2/2020 | Liu et al. |
| 2020/0072996 | A1* | 3/2020 | Zhao ........................ G01V 1/30 |
| 2020/0190974 | A1 | 6/2020 | Manders |
| 2021/0017854 | A1 | 1/2021 | Fang |
| 2021/0054728 | A1* | 2/2021 | Fellinghaug ............ E21B 47/16 |
| 2021/0124072 | A1 | 4/2021 | Steel et al. |
| 2021/0364477 | A1 | 11/2021 | Shoji et al. |

FOREIGN PATENT DOCUMENTS

| | | | |
|---|---|---|---|
| WO | WO-2018176024 | A1 | 9/2018 |
| WO | WO-2018183246 | A1 | 10/2018 |
| WO | 2019118189 | A1 | 6/2019 |

OTHER PUBLICATIONS

International Search Report and Written Opinion for International Application No. PCT/US2020/057344 dated Jan. 26, 2021, 14 pages.
International Search Report and Written Opinion for International Application No. PCT/US2020/057415 dated Jan. 27, 2021, 8 pages.
International Search Report and Written Opinion for International Application No. PCT/US2020/057418 dated Jan. 26, 2021, 11 pages.
Oct. 17, 2022—U.S. Final Office Action—U.S. Appl. No. 17/080,155, 32 Pages.
Nov. 25, 2022—U.S. Non-Final Office Action—U.S. Appl. No. 17/080,763, 30 Pages.
Feb. 3, 2023—U.S. Non-Final Office Action—U.S. Appl. No. 17/080,216, 10 Pages.
Apr. 6, 2023—U.S. Final Office Action—U.S. Appl. No. 17/080,763, 30 Pages.
Mar. 17, 2023—U.S. Non-Final Office Action—U.S. Appl. No. 17/080,155, 44 Pages.
Aug. 16, 2023—U.S. Notice of Allowance—U.S. Appl. No. 17/080,216, 12 Pages.
Aug. 18, 2023—U.S. Non-Final Office Action- U.S. Appl. No. 17/080,763, 34 Pages.
Sep. 26, 2023—U.S. Final Office Action—U.S. Appl. No. 17/080,155, 52 Pages.
Extended European Search Report for Application No. 20878482.7 dated Oct. 17, 2023 (12 pages).
Supplementary European Search Report for Application No. EP 20 87 9562 dated Nov. 7, 2023 (8 pages).
Supplementary European Search Report for Application No. EP 20 87 9978 dated Nov. 9, 2023 (9 pages).

* cited by examiner

SYSTEMS AND METHODS FOR DETERMINING WELL CASING ECCENTRICITY

CROSS-REFERENCE TO RELATED APPLICATIONS

The present application claims priority to U.S. Provisional Application No. 63/094,258 filed Oct. 20, 2020 and U.S. Provisional Application No. 62/926,243 filed Oct. 25, 2019 and U.S. Provisional Application No. 62/926,228 filed Oct. 25, 2019 and U.S. Provisional Application No. 63/032,240 filed May 29, 2020. Each of these applications is incorporated by reference in its entirety herein.

BACKGROUND

I. Field

Aspects of the present disclosure relate generally to systems and methods for analyzing subterranean cylindrical structures using acoustic sensing and more particularly to identifying isolation in connection with wellbore plug and abandon techniques.

II. Discussion Of Related Art

Production of hydrocarbons involves forming one or more wells in a subterranean formation. Generally, in connection with formation of a well, a wellbore is drilled and a casing is passed down the wellbore. The casing often includes sections with differing diameters, eccentricities, and/or bonding with surrounding material. In some regions, there may be concentric casing. In many instances, a casing or outer casing forms an annular space with surrounding rock. The annular space is commonly filled with cement or a similar material over at least part of its length when the well is created. Production tubing is passed through the casing, and the hydrocarbons are produced through the production tubing. In this context, the casing supports the wellbore and prevents collapse of the well.

Wellbores may be plugged and abandoned at the end of the wellbore useful life to prevent environmental contamination, among other benefits. At the end of the useful life, a wellbore commonly includes cemented casing with the production tube passed down the casing. In connection with plug and abandon, an effective seal is created across a full diameter of the wellbore. Conventionally, production tubing is removed and casing is milled away, along with cement exterior to the casing, before setting a continuous new cement plug across the full diameter of the wellbore, from rock to rock. Alternatively, the casing can be left in place, provided that the quality of original cement and cement bond to the exterior of the casing are confirmed. If the cement and cement bond to the exterior of the casing is adequate, a new cement plug can be set inside the casing, thereby effectively creating a barrier across the full diameter of the wellbore.

Thousands of meters of production tubing are typically removed to identify isolation corresponding to regions of cement having seal integrity suitable for plug and abandon. Stated differently, identifying one or more locations of isolation provided by exterior cement during plug and abandon activities conventionally involves removal of internal completion to permit logging tools free access to casings. Through-tubing plug and abandonment may theoretically be performed without removing the production tubing, saving considerable expense. The tubing may simply be cut or perforated and cement passed down the tubing and back up the annulus between tubing and casing to form a plug across the full casing diameter. However, this would involve assessment of the cement bond with casing from a location within the production tubing, and conventional techniques are unable to detect an integrity of a cement bond with a casing through the production tubing, casing, and any material, such as water, air, and/or gas. Isolation detection is thus time and resource extensive. It is with these observations in mind, among others, that various aspects of the present disclosure were conceived and developed.

SUMMARY

Implementations described and claimed herein address the foregoing problems by providing systems and methods for characterizing a subterranean structure. In one implementation, a radial acoustic log is obtained. The radial acoustic log is captured using a radial sensor of an acoustic logging tool deployed within a first structure. The first structure disposed within a second structure in a subterranean environment. A radial symmetry is determined using the radial acoustic log. An eccentricity of the first structure relative to the second structure is determined based on the radial symmetry.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
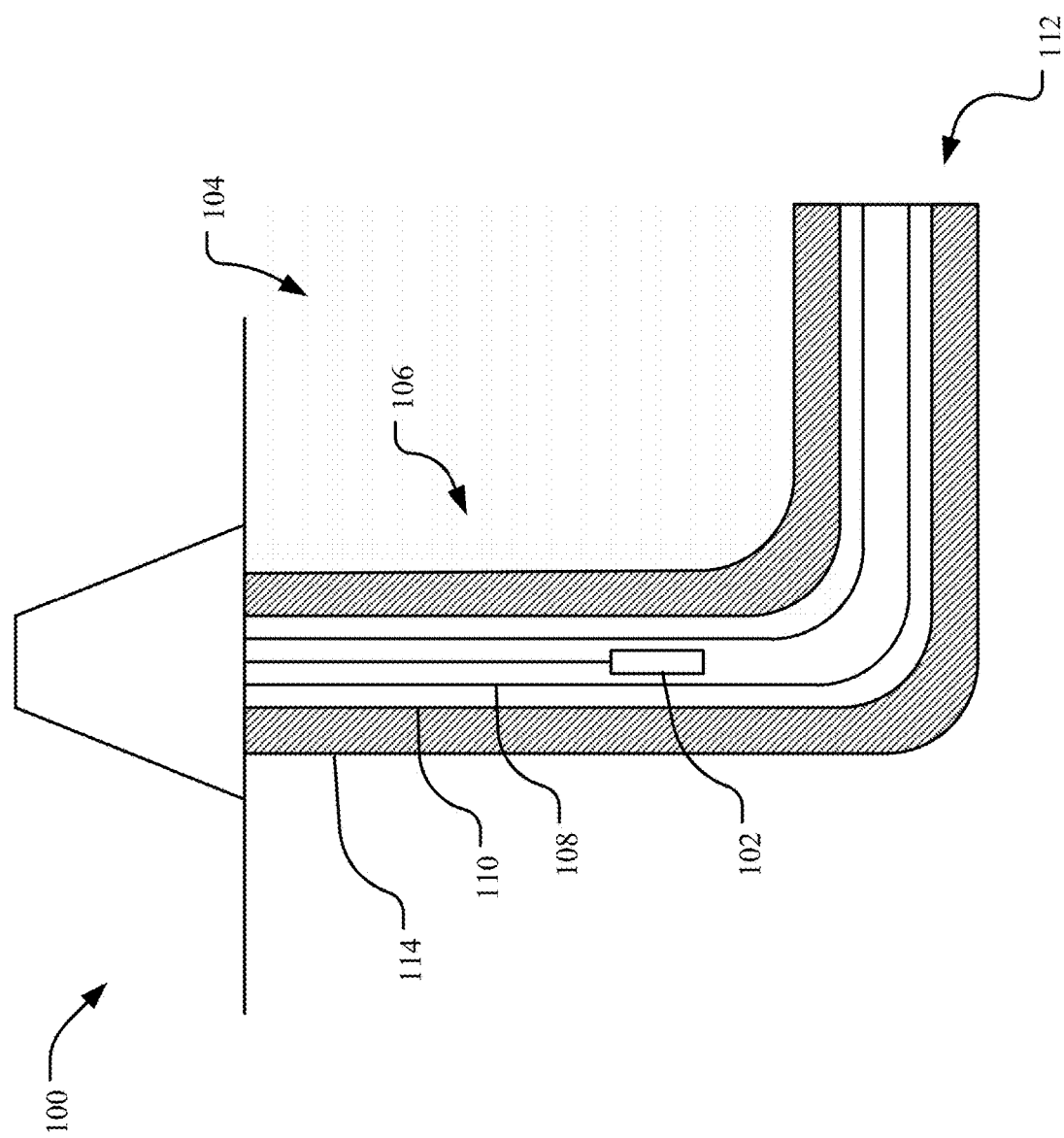
FIG. 1 shows an example isolation detection system for characterizing a subterranean structure.

Aspects of the present disclosure involve systems and methods for analyzing a structure, such as a cylindrical structure and/or a subterranean structure, using acoustic waves. In one aspect, an acoustic logging tool of an isolation detection system having one or more acoustic sensors is deployed in a production tube to detect cement integrity around a casing in a downhole environment of a wellbore. The one or more acoustic sensors may include an axial sensor and/or a radial sensor. The acoustic logging tool can include two or more independent acoustic sensors working in orthogonal directions. At least one of the two or more independent acoustic sensors is operably arranged to measure axially along a length of the wellbore, and at least one of the two or more independent acoustic sensors is operably arranged to measure radially along the wellbore. Acoustic logging data captured by the independent acoustic sensors may be used to determine a presence of cement within an isolation region and axial and radial symmetry of the cement, from which anomalies may be identified. The radial acoustic sensory may be used to identify an eccentricity of the production tube within the casing and/or identify a region of solid cement within the annulus between the casing and the formation. The acoustic sensors provide isolation detection through both the production tube and the casing, without removal of internal completion, thereby reducing the time and resources expended for plug and abandon operations, among other advantages.

I. Terminology

In the description, phraseology and terminology are employed for the purpose of description and should not be regarded as limiting. For example, the use of a singular term, such as "a", is not intended as limiting of the number of items. Also, the use of relational terms are used in the description for clarity in specific reference to the figure and are not intended to limit the scope of the present inventive concept or the appended claims. Further, any one of the features of the present inventive concept may be used separately or in combination with any other feature. For example, references to the term "implementation" means that the feature or features being referred to are included in at least one aspect of the presently disclosed technology. Separate references to the term "implementation" in this description do not necessarily refer to the same implementation and are also not mutually exclusive unless so stated and/or except as will be readily apparent to those skilled in the art from the description. For example, a feature, structure, process, step, action, or the like described in one implementation may also be included in other implementations, but is not necessarily included. Thus, the presently disclosed technology may include a variety of combinations and/or integrations of the implementations described herein. Additionally, all aspects of the presently disclosed technology as described herein are not essential for its practice.

Lastly, the terms "or" and "and/or" as used herein are to be interpreted as inclusive or meaning any one or any combination. Therefore, "A, B or C" or "A, B and/or C" mean any of the following: "A"; "B"; "C"; "A and B"; "A and C"; "B and C"; or "A, B and C." An exception to this definition will occur only when a combination of elements, functions, steps or acts are in some way inherently mutually exclusive.

II. General Architecture and Operations

To begin a detailed discussion of an example isolation detection system for characterizing a subterranean structure, reference is made to FIG. 1. In one implementation, an isolation detection system 100 including an acoustic logging tool 102 having one or more acoustic sensors is deployed into the subterranean structure. Examples of the various systems and methods described herein reference the subterranean structure including a production tube and casing in connection with isolation detection for plug and abandon operations. However, it will be appreciated by those skilled in the art that the presently disclosed technology is applicable to various types of structures, systems, and operations, including outside the oil and gas context. For example, the acoustic logging tool 102 may be used to determine a condition of pipes in connection with pigging operations in the oil and gas industry, the water industry, and/or the like. As another example, the acoustic logging tool 102 may be used in oil and gas applications to inspect structures deployed outside of downhole environments. Additionally, the acoustic logging tool 102 may be used to inspect fabricated pipes, storage tanks, and/or cylindrical structures to determine an integrity of structure containment and/or identify materials and connections outside and/or inside the structures.

Turning to FIG. 1, the acoustic logging tool 102 is received within a wellbore 106 formed in a subterranean formation 104. The wellbore 106 may involve a production tube 108 deployed in a casing 110. Cement 114 may fill an annulus 112 formed between the casing 110 and the formation 104, thus securing the casing 110 within the wellbore 106. The production tube 108 may be used in connection with the extraction of hydrocarbons from the formation 104. While FIG. 1 illustrates the wellbore 106 having a substantially vertical portion and a substantially horizontal portion, it will be appreciated that the acoustic logging tool 102 may be deployed within any wellbore arrangement having any number of vertical portions, horizontal portions, and/or any angle therebetween. Further, while FIG. 1 illustrates a land-based operation, it will be appreciated that the acoustic logging tool 102 may be utilized in land-based and/or sea-based operations.

In one implementation, the acoustic logging tool 102 is deployed within the production tube 106 to determine the continuity and/or symmetry of the cement 114 prior to plugging and abandoning the wellbore 106. The wellbore 106 can be plugged and abandoned following exhaustion and/or usefulness of the subterranean formation 104 for production of hydrocarbons. Successful plug and abandonment of the wellbore 106 involves a portion of the cement 114 having one or more isolation regions to prevent environmental contamination. As detailed herein, the isolation regions may be detected based on axial symmetry and radial symmetry. The acoustic logging tool 102 determines the axial and/or radial symmetry or asymmetry in the cement 114 through the production tube 108 and the casing 110, thereby allowing determination of an appropriate plug and abandonment location without removal of the production tube 108. While the production tube 108 disposed within the wellbore 106 is ideally concentric with the casing 110 and/or the wellbore 106 formed through at least a portion of the subterranean formation 104, the production tube 108 can be eccentric, and the eccentricity of the casing 110 can vary over the length of the wellbore 106, which can be referred to as an oblique casing.

Figure 2:
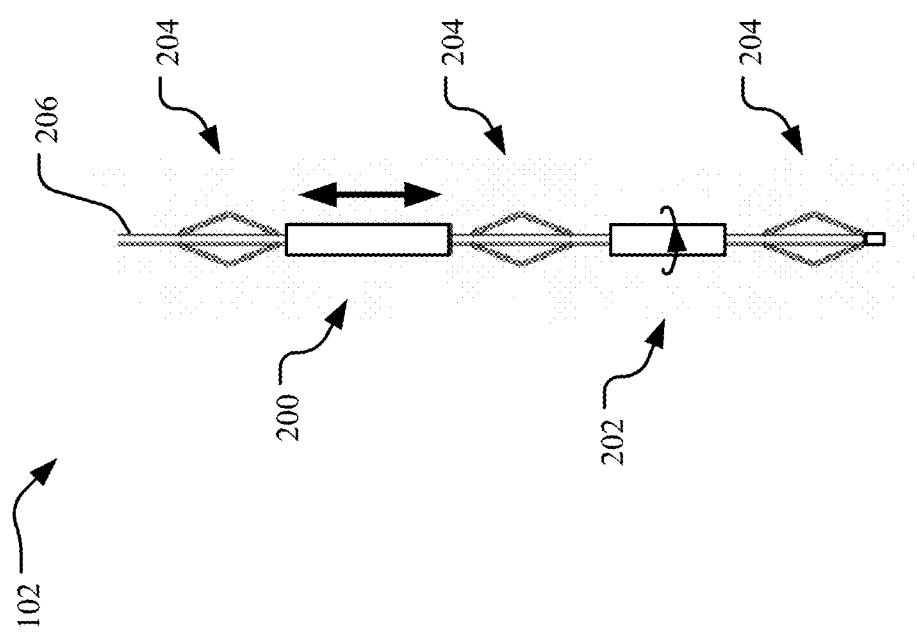
FIG. 2 illustrates an example acoustic logging tool of the isolation detection system.

As can be understood from FIG. 2, in one implementation, the acoustic logging tool 102 includes a radial sensor 202, an axial sensor 200, and one or more centralizers 204. The axial sensor 200 includes one or more axial acoustic transmitters and one or more axial acoustic receivers, and the radial sensor 202, which can rotate, includes one or more radial acoustic transmitters and one or more radial acoustic receivers. The centralizers 204 may be positioned above and below the acoustic sensors 200-202 to maintain the acoustic logging tool 102 in a centralized coaxial position inside a length of the production tubing 108, which is vertically oriented and located coaxially within a length of the casing 110. The casing 110 or an outer casing forms the annular space 112 with the surrounding subterranean formation 104 of the wellbore 106. The annular space 112 may be filled with the cement 114 or a similar material over at least part of its length when the well is created, and upon filling, the cement 114 is intended to bond with the casing 110 or outer casing to provide a seal.

Figure 3:
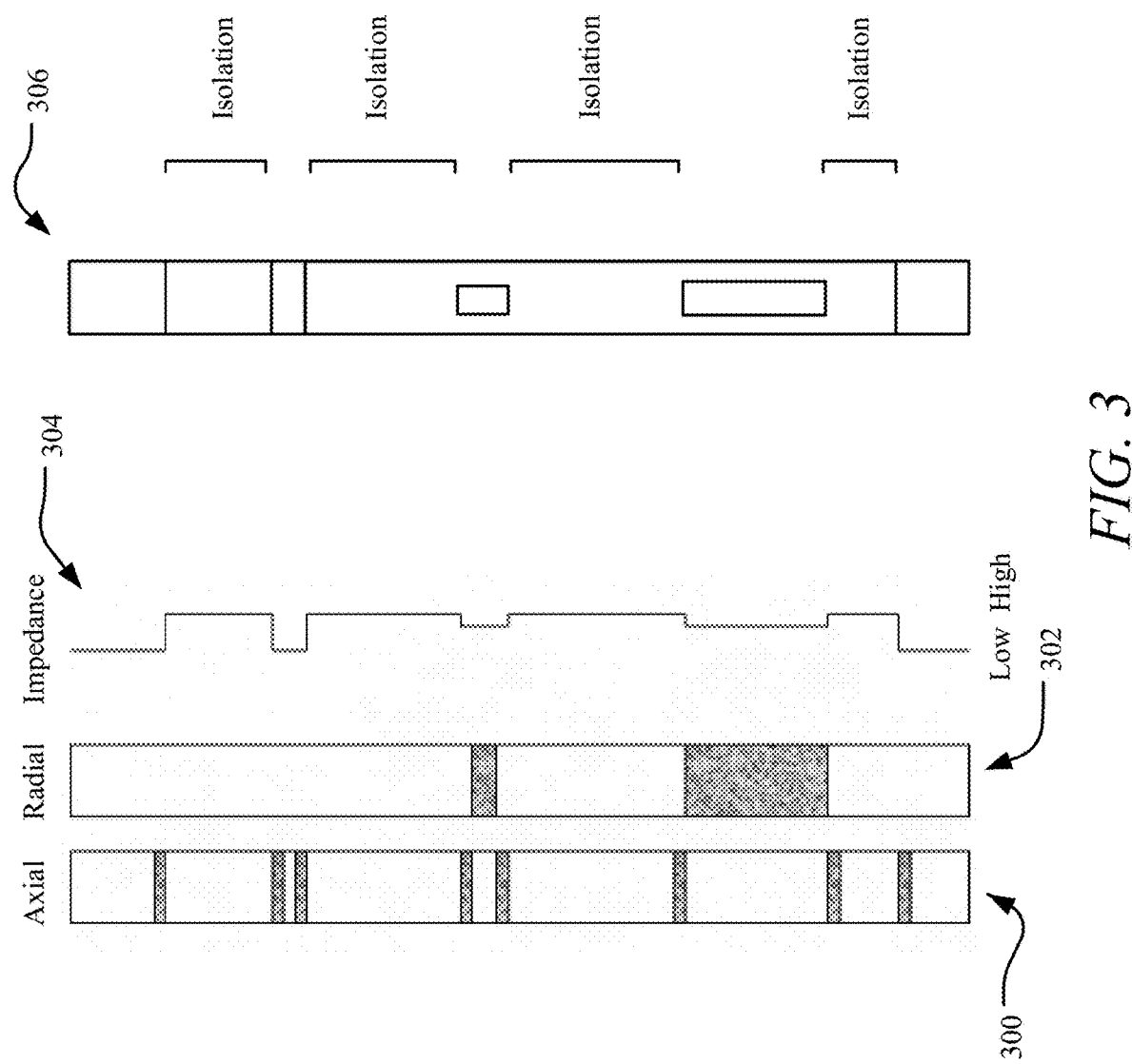
FIG. 3 depicts acoustic data captured using the acoustic logging tool and a characterization of isolation of the subterranean structure.

In one implementation, the radial sensor 202 and the axial sensor 200 are independent sensors operating in orthogonal directions. The radial sensor 202 confirms a presence of radial symmetry in an isolation region, and the axial sensor 200 confirms a presence of axial symmetry in the isolation region. The axial sensor 200 scans in an axial direction along a length of the production tube 108, while the radial sensor 202 scans in a radial direction that is orthogonal to a general axis of the length of the production tube 108. As such, the axial sensor 200 detects changes in waves traveling along the casing 110 reflected from anomalies in the materials beyond the casing 110, as well as changes in the production tube 108 and casing collars, while the radial sensor 202 detects changes in waves travelling around the casing 110 reflected from anomalies in the materials beyond the casing 110. Thus, referring to FIG. 3, an axial log 300 is captured using the axial sensor 200 and a radial log 302 is captured using the radial sensor 202. In some implementations, each of the radial sensor 202 and the axial sensor 200 may capture both the axial log 300 and the radial log 302. The acoustic sensors 200-202, alone or together, provide an approximate measure of acoustic impedance 304 of the material surrounding the casing, which may be used in cement classification. Combining the axial log 300, the radial log 302, and the acoustic impedance 304, a characterization of isolation 306 may be generated. As shown in the characterization of isolation 306, isolation occurs when the axial log 300 includes an axial symmetry, the radial log 302 includes a radial symmetry, and the acoustic impedance 304 is high.

Generally, the axial sensor 200 senses short, thick features or anomalies on the casing 110, while the radial sensor 202 senses long, thin features or anomalies on the casing 110. Additionally, the radial sensor 202 may be used to determine the eccentricity of the production tube 108 relative to the casing 110 and/or the wellbore 106. The axial sensor 200 and the radial sensor 202, alone or in combination, may be used to determine whether material in contact with the casing 110 is cement or another material. Stated differently, both the radial sensor 202 and the axial sensor 200 may detect axial symmetry and radial symmetry and classify a material in contact with the casing 110 in terms acoustic impedance.

In one implementation, the acoustic logging tool 102 is deployed along the length of the production tube 108 as the radial sensor 202 and/or the axial sensor 200 scans. Using the axial log 300 acquired from the scans, a determination may be made regarding whether there is axial symmetry, such that the material in contact with the casing 110 is homogeneous. Similarly, using the radial log 302 acquired from the scans, a determination may be made regarding whether there is radial symmetry, such that the material in contact with the casing 110 is homogeneous in a radial plane. Thus, based on the axial symmetry and/or the radial symmetry, there is confirmation that for the length of travel of the acoustic logging tool 102 along the production tube 108 during the scan, the material in contact with the casing 110 is axially and/or radially the same. Accordingly, the material is free from anomalies, whether short and thick or long and thin, and isolation is present. In other words, the acoustic logging tool 102 senses whether the material surrounding the casing 110 is bonded with the casing 110 around an entirety of the casing 110. Additionally, the acoustic logging tool 102 may be used to identify the material surrounding the casing 110. For example, the material may be cement, a fluid, a gas, and/or the like.

In one example implementation, the acoustic logging tool 102 is deployed to evaluate isolation between the casing 110 and subterranean formation 104, such as bedrock, around a hole from inside the production tube 108. The acoustic logging tool 102 provides 360° of coverage sufficient to identify anomalies that are of approximately one inch of diameter or greater at the casing-cement/barrier interface. As described here, the acoustic logging tool 102 discriminates between a vertically continuous anomaly and a vertically discontinuous anomaly, as well as between different types of materials, such as liquid (gas, seawater, brine, water-based mud, oil-based mud, etc.) and solid (e.g., cement, creeping shale, salt, etc.). Additionally, the acoustic logging tool 100 is able to cope with variable tubing conditions, such as the presence of oil, scale, corrosion, and/or the like.

The acoustic logging tool 102 can dynamically calibrate in response to temperatures and/or pressures present within the wellbore 206 and downhole environment. The wellbore 106 and the downhole environment can have high temperatures and high pressures, which can individually and/or collectively change sensor performance within the acoustic logging tool 102. In one implementation, Aluminum Beryllium alloy (AlBeMet) can be implemented as a component supporting acoustic elements of the acoustic logging tool 102. AlBeMet can be characterized with a very high speed of sound, approximately 9,656 m/s. As the acoustic logging tool 102 is operated, the high speed of sound can allow a "pure" signal traveling through the axial sensor 200 to be received prior to a return signal. The "pure" signal response can thus allow regular dynamic (e.g. in-situ) calibration of the acoustic logging tool 102 operating in the wellbore 106 and downhole environment. Stated differently, calibration of a receiver array of the axial sensor 200 may drive system performance for axial sensing. In one implementation, to dynamically calibrate each receive element within the operating environment of the wellbore 106, each receiver element is supported via a central bar running through all acoustic elements. In choosing a material with a very high velocity (e.g., AlBeMet), a transmitted pulse arrives at each of the receive elements in turn (above and below the transmitter) before anything else. The received signals may be monitored in response to the calibration pulse and the respective channel gain values adjusted to deliver equal outputs.

The acoustic logging tool 102 is movable axially within the production tube 108. A computing device obtains data captured using the acoustic logging tool 102 and processes the recorded data. The acoustic logging tool 102 transmits and receives waves. The acoustic logging tool 102 may record the captured signal or transmit the signal to a surface computing device at the surface for recording. The recorded data may be communicated to the computing device from the acoustic logging tool 102 or via another computing device and/or data storage device using a wireless connection (e.g., for communication over a network) or a wired connection. In some implementations, the computing device may include a display, at least one power source, at least one processor, a signal generator, controls, and/or the like for controlling the acoustic logging tool 102, recording signal data, displaying signal data, and/or processing the signal data as described herein. The computing device may be present on-site or remote from the downhole environment of the wellbore 106. It will further be appreciated that the same or separate computing devices may be used to control the acoustic logging tool 102 in connection with capturing and recording signals and to process the captured signals.

Figure 4A:
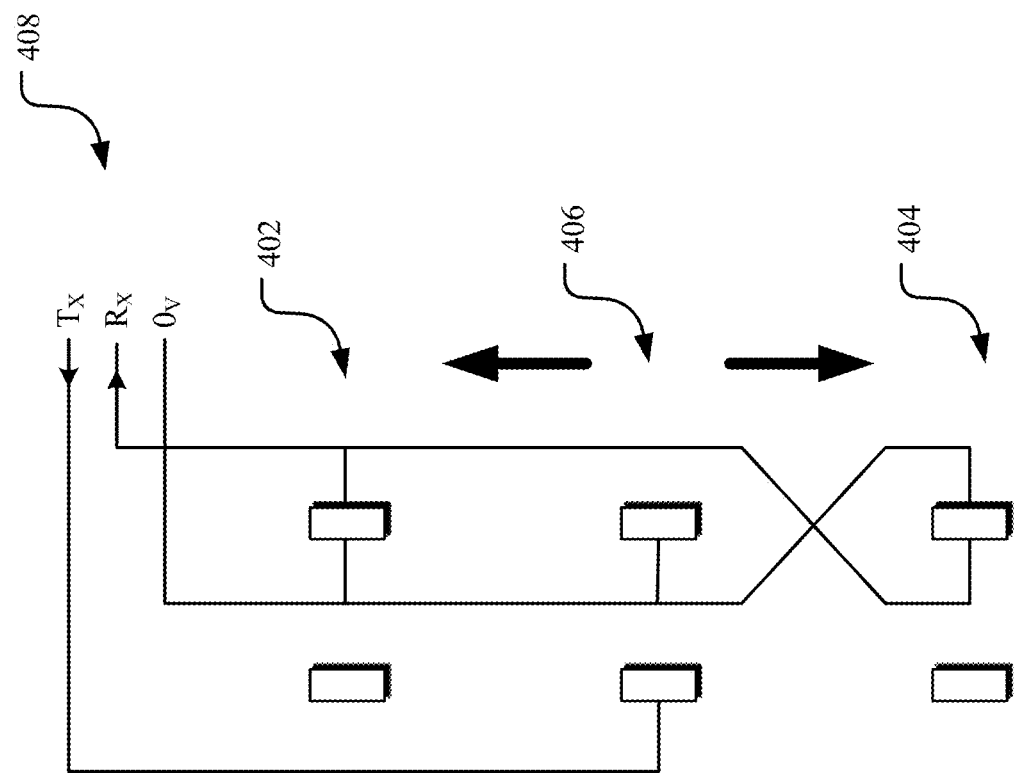
FIG. 4A shows an example axial sensor configuration of the acoustic logging tool.

Turning to FIG. 4A, an example axial sensor configuration 400 of the axial sensor 200 of the acoustic logging tool 102 is shown. In one implementation, the acoustic logging tool 102 implements differential sensing for each of the sensors 200-202. As shown in FIG. 4A, in one implementation, the axial sensor configuration 400 includes a single central transmission element and single receiver elements spaced equally above and below the transmission element. In this implementation, waves propagate out from the transmission element to the single receiver elements.

The axial sensor configuration 400 includes a first receiver 402 and a second receiver 404 positioned above and below a transmitter 406. The axial sensor configuration 400 may include a first spacing 410 and a second space 412 between the receivers 402-404, respectively, and the transmitter 406. The spacings 410-412 may be the same, such that the receivers 402-404 are spaced equidistant. The axial sensor configuration 400 of the axial sensor 200 measures differential measurements by summing signals in differential amplifier. In one implementation, the receivers 402, 404 are coupled in reverse polarity, thereby allowing the signal received by each receivers 402, 404 to offset the other, producing a cumulative receiver output 408 in the form of a differential signal. In another implementation, the receivers 402, 404 are subtracted one from the other, thereby producing the cumulative receiver output 408 as a differential signal.

The transmitter 406 is energized, thereby generating an energy that will travel to and/or be received by each of the receivers 402, 404. If the transmission paths experienced by the energy traveling from the transmitter 406 to each of the receivers 402, 404 are identical, the cumulative receiver output 408 will approximate or have a value of zero. If the transmission paths experienced by the energy traveling from the transmitter 406 to each of the receivers 402, 404 are different, the difference will be represented at the cumulative receiver output 408 with a non-zero value.

Figure 4B:
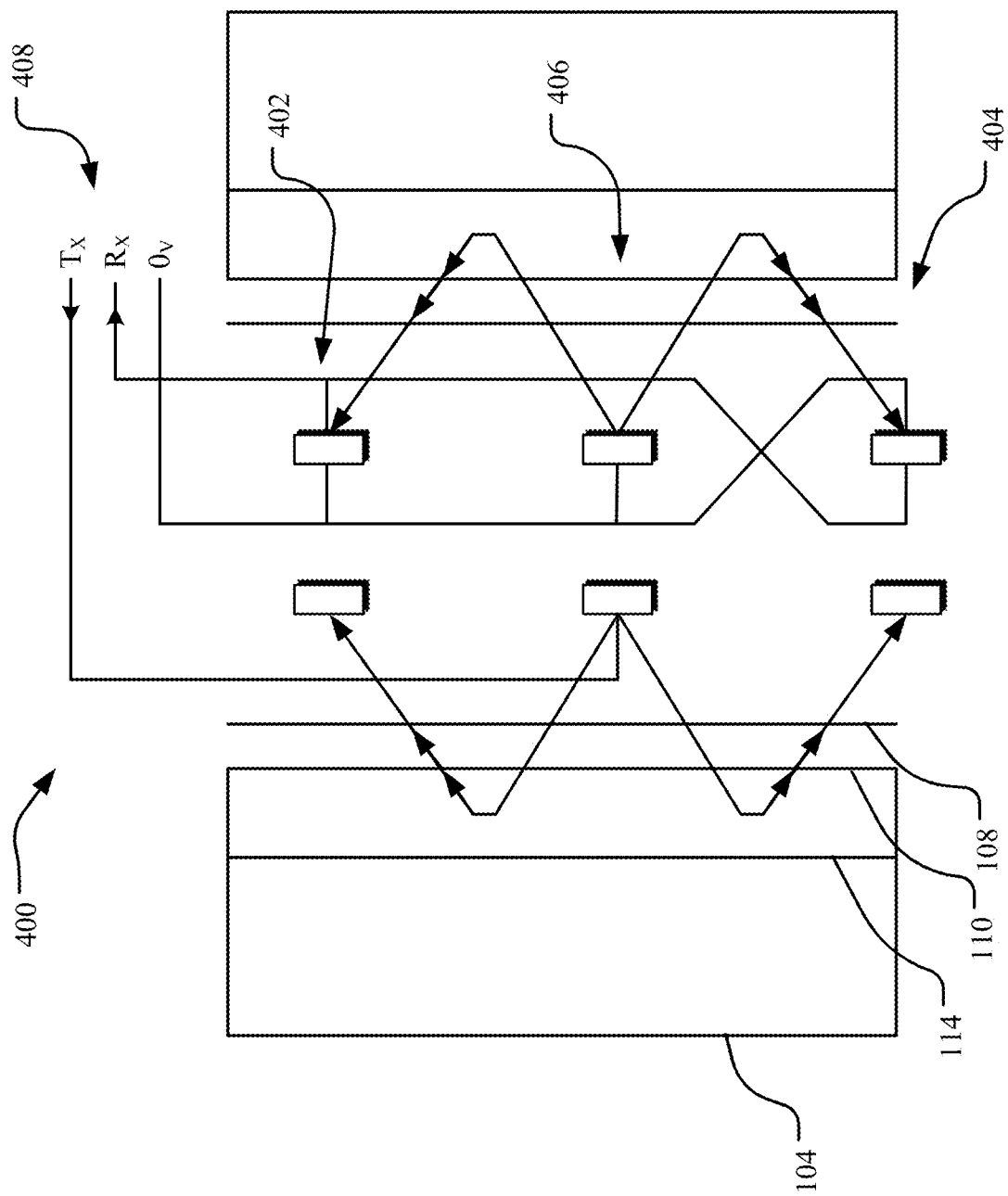
FIG. 4B illustrates the axial sensor configuration disposed in an example downhole environment.

Referring to FIG. 4B, the axial sensor 200 is deployed in the wellbore having an axial symmetry. The axial sensor configuration 400 of the axial sensor 200 may be used to determine the symmetry of the cement 114 in an axial and/or lateral direction. The transmitter 406 transmits energy traveling up and/or down, as well as moving into the surrounding materials (e.g. the production tube 108, the casing 110, the cement 114, and/or the subterranean formation 104). The transmitted energy is received by the receivers 402, 404 after having travelled through the various features disposed between the transmitter 406 and the receivers 402, 404.

As can be appreciated in FIG. 4B, the cement 114 is substantially symmetrical longitudinally, providing the cumulative receiver output 408 of zero. The transmitted energy received by the receiver 402 is substantially offset by the transmitted energy received by the receiver 404. The receivers 402, 404 can be arranged either with reverse polarity or one receiver 402, 404 can be subtracted from the other, thereby producing the differential output signal 408. The differential output signal 408 may be used to determine the absence of anomalies or other asymmetry within the cement 114. Stated differently, the differential output 408 may be used to confirm an axial symmetry within the wellbore 106.

When the cement 114 includes an anomaly or other asymmetry, the energy transmitted by the transmitter 406 is received by the receiver 402 having interacted with and be disrupted by the anomaly, while the energy transmitted by the transmitter 406 is received by the receiver 404 having travelled through substantially symmetric cement. Thus, the cumulative receiver output 408 is non-zero. The non-zero cumulative receiver output 408 thereby identifies the presence of the anomaly within the cement 114 because the transmission path experienced by the transmitted energy to the receivers 402, 404 differs. The receivers 402, 404 arranged in reverse polarity and/or as differential sensing provides an inherently sensitive axial sensor 200, thereby allowing the identification of isolation regions.

It will be appreciated that the axial sensor configuration 400 may alternatively include a single element central transmitter with outboard receiver arrays. Here, waves propagate out from the transmitter to the receiver arrays. The receiver arrays allow velocity filtering to select the desired propagation modes. Alternatively, a single receiver array with acoustic transmitters disposed substantially equidistance above and below the single acoustic sensor array. The single central receiver array and the single element outboard transmitters 410, 414 include waves propagating from the transmitters inwards towards the receiver array where they can be separated by a velocity filter to give their positive and negative velocities. Following the separation, the positive wave is subtracted from the negative wave to obtain a differential output. Such a configuration has the advantage of reducing the number of outputs (n receiver elements) so the electronics and data recording are simplified.

Referring to FIG. 5, a first diagram 500 corresponds to a first propagation mode and a second diagram 502 corresponds to a second propagation mode. In one example, the first propagation mode may be P waves or other fast waves, and the second propagation mode may be Rayleigh waves or other slow waves. The P waves may be fast traveling, high penetration compressional waves. The P waves pass through the casing 110 through the cement 114 and into the subterranean formation 104 before being received by a receiver of the axial sensor 200. The axial acoustic signal received by the receiver and a speed at which the axial acoustic signal is received may be used to determine what the P waves interacted with and/or traveled through (e.g., the casing 110, the cement 114, the formation 114, as well as any anomalies).

As can be appreciated in the example of the first diagram 500, the cement 114 is non-continuous along a length of the casing 110, thereby altering the P waves received by the receiver of the axial sensor 200. The P waves can be interrupted by the lack of cement 114 at an uphole portion of the wellbore 106, thereby preventing the P waves from reaching the subterranean formation 104 and altering the P waves travel path and/or travel time to the acoustic receiver of the axial sensor 200.

The Rayleigh waves may be slow traveling, low penetration surface waves generating elliptical motion. The Rayleigh waves pass through the casing 110 and into the cement 114 but are unable to pass through the cement 114 into the subterranean formation 104 before being received by an acoustic receiver of the axial sensor 200. The signal received by the acoustic receiver and speed at which the signal is received may be used to determine what the Rayleigh waves 504 interacted with and/or traveled through (e.g. the casing 110 and/or the cement 114).

As can be appreciated in the example of the second diagram 502, the cement 114 is non-continuous along a length of the casing 110, thereby altering the Rayleigh waves and their elliptical motion before being received by the acoustic receiver of the axial sensor 200. The Rayleigh waves can be the interrupted by the lack of cement 114 at an uphole portion of the wellbore 106, thereby altering the Rayleigh waves elliptical motion and travel path to the acoustic receiver of the axial sensor 200.

Figure 5B:
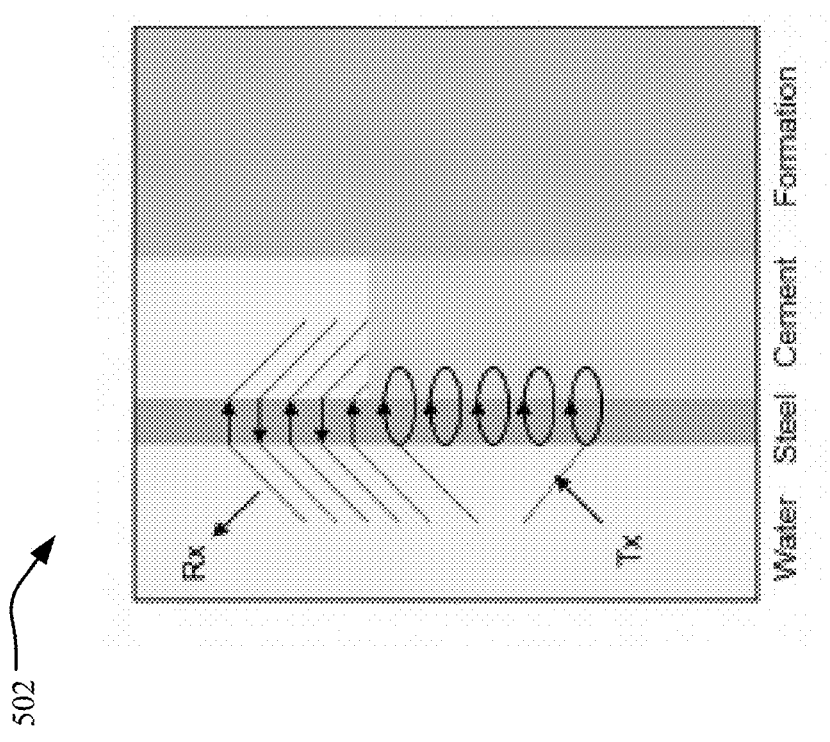
FIG. 5B shows example Rayleigh waves within an example downhole environment.
Figure 5A:
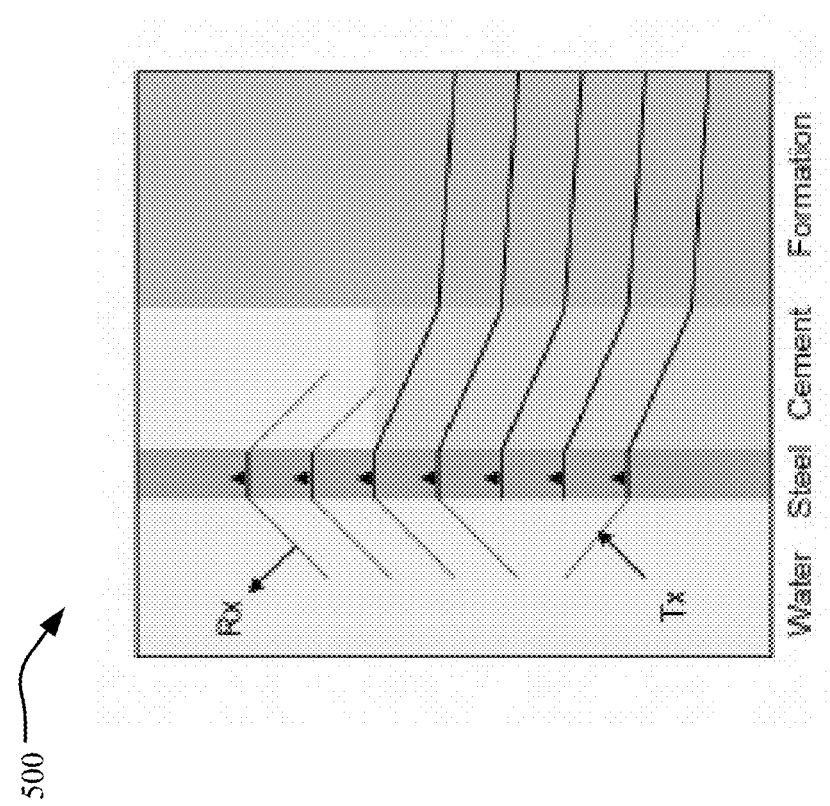
FIG. 5A illustrates example P waves within an example downhole environment.

Referring to FIGS. 5A and 5B, an acoustic receiver array can produce a differential output detailing the response for both P waves and Rayleigh waves. The differential output can be separated into a slow waves (Rayleigh) output and a fast waves (P waves) output, each with respect to acoustic receiver element. The differential output can be separated into the slow waves output and the fast waves output through the use of velocity filtering techniques. Additionally, the velocity filtering can determine the frequency domain of each of the slow waves (Rayleigh) and fast waves (P waves) through a determination of the velocity of each waveform. The frequency domain can be represented as cycles per meter (along the length of the wellbore 106) relative to frequency. Upon obtaining the velocity for the respective waveforms, frequency plots can be generated for each of the slow waves (Rayleigh) and fast waves (P waves), respectively.

As can be further appreciated with respect to FIGS. 4A and 4B, the isolation tool is operably disposed within the production tubing string and thus the differential output will illustrate the slow waves (Rayleigh) and fast waves (P waves) traveling through the production tubing string along with the well casing, cement, and subterranean formation. The eccentricity of the production tubing can be presented on the differential output due to the propagation of the slow waves (Rayleigh) and fast waves (P waves) through the production tubing string.

Figure 6A:
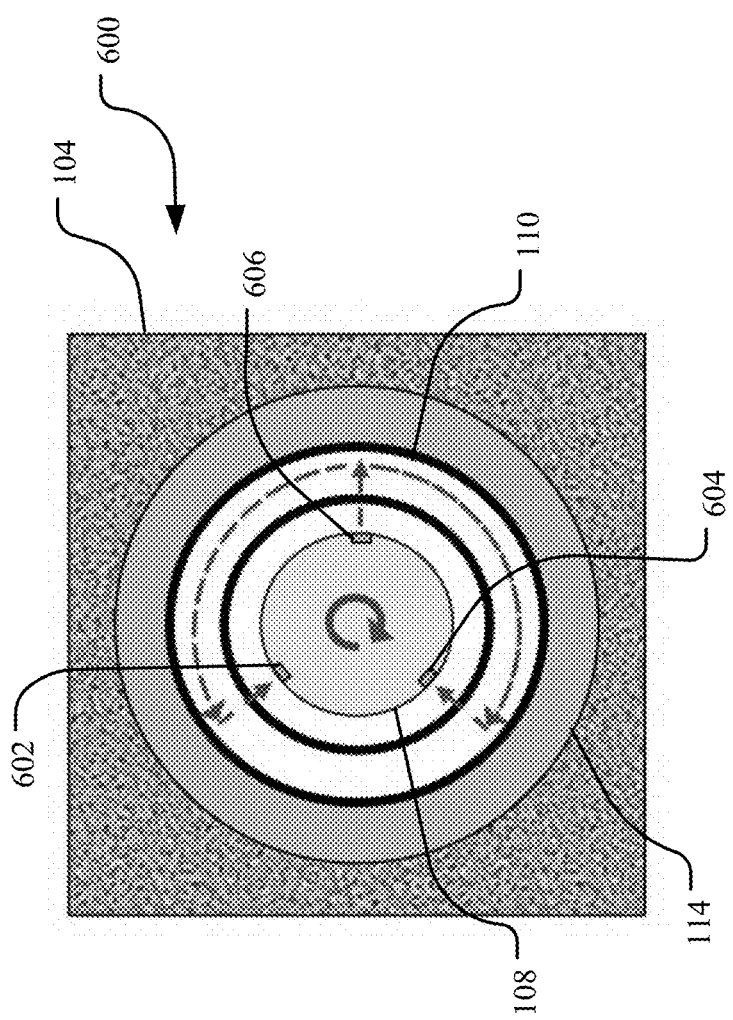
FIG. 6A shows an example radial sensor configuration of the acoustic logging tool deployed in an example downhole environment.
Figure 6B:
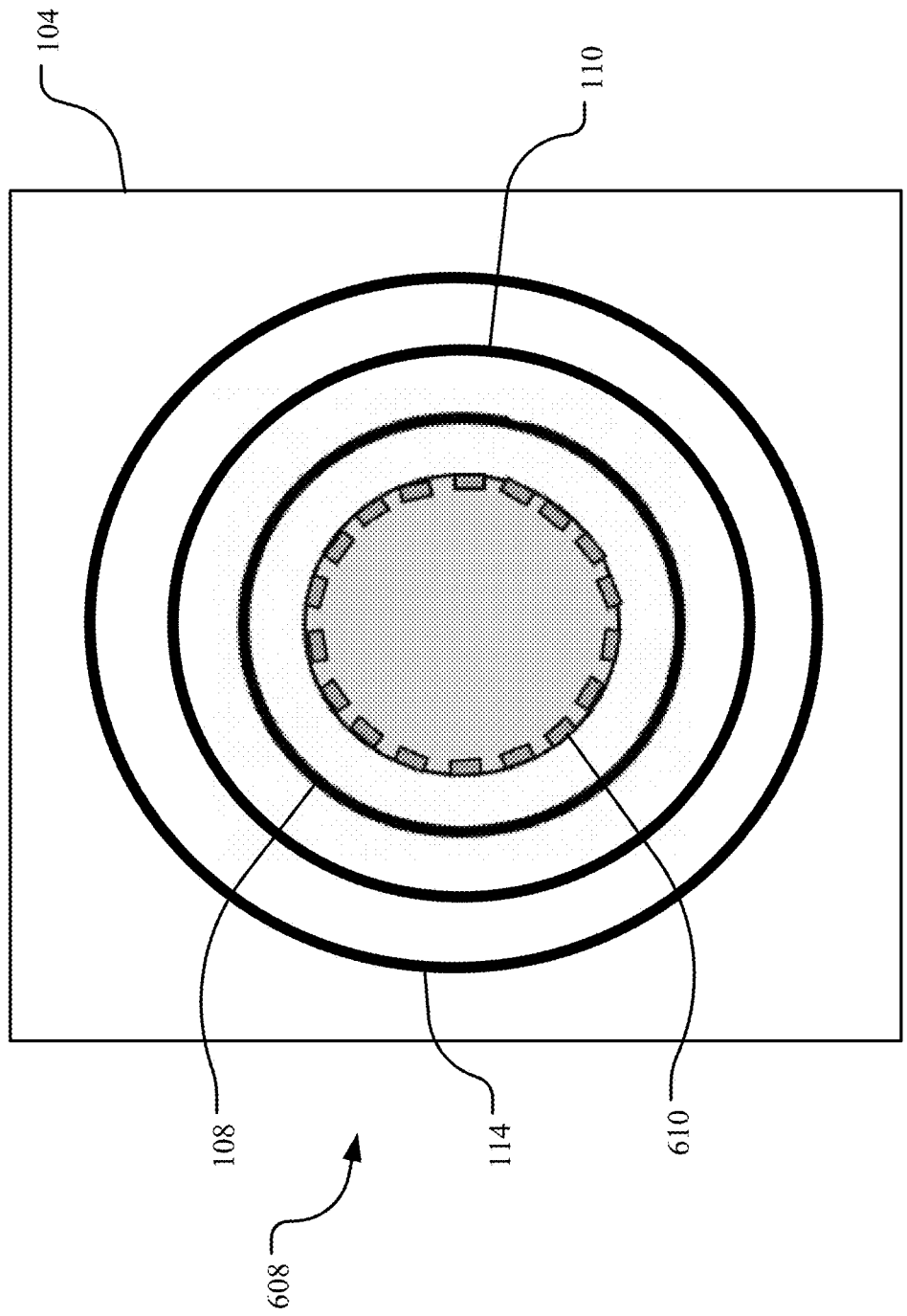
FIG. 6B illustrates an example radial sensor configuration with a sensor array having a plurality of sensors configured for both transmission and reception.

Turning to FIGS. 6A-6B, the radial sensor 202 determine an eccentricity (e.g. radial deviation of the production tube 108 relative to the casing 110), an obliqueness (e.g. a axial deviation of the production tube 110 relative to the wellbore 106), and/or the symmetry of the cement 114 in an axial direction and/or a radial direction. While the axial sensor 200 may be used to detect the obliqueness, the radial sensor 202 may be used to detect both the eccentricity and obliqueness.

In an eccentric arrangement in which the production tube 108 is non-concentric relative to the casing 110 and/or the wellbore 106 in a radial and/or axial direction, the transmitted energy received by the radial sensor 202 would produce a differential output signal. The radial sensor 202 may be used to detect longitudinal (e.g. axial) deviation of the production tube 108 within the wellbore 106 (e.g. obliqueness) and/or eccentricity (e.g. radial deviation from center of the wellbore 106).

FIG. 6A illustrates an example configuration 600 of the radial sensor 202. In one implementation, the radial sensor 202 includes receivers 602, 604 and a transmitter 606 circumferentially disposed within the production tube 108. The transmitter 606 transmits energy that travels circumferentially into the surrounding materials (e.g. production tube 108, casing 110, cement 114, and/or subterranean formation 104). The transmitted energy is received by the receivers 602, 604 after having travelled through the various components disposed between the transmitter 606 and the receivers 602, 604.

As can be appreciated in FIG. 6A, the cement 114 is substantially symmetrical circumferentially, providing a cumulative receiver output of zero. The transmitted energy received by the receiver 602 is substantially offset by the transmitted energy received by the receiver 604. The receivers 602, 604 can be arranged either with reverse polarity or one receiver can be subtracted from the other, thereby producing a differential output signal. The data captured by the radial sensor 202 may be used to determine the absence of anomalies or asymmetries within the cement 114, as well as an eccentricity of the production tube 108.

Where an anomaly is present, the energy transmitted by the transmitter 606 is received by the receiver 602 having interacted with and been disrupted by the anomaly, while the energy transmitted by the transmitter 606 is received by the receiver 604 having travelled through substantially symmetric cement. Thus, the cumulative receiver output is non-zero. The non-zero cumulative receiver output may be used to identify an asymmetry, such as that caused by the anomaly 500, within the cement 114 because the transmission path experienced by the transmitted energy to the receivers 602, 604 differs. The receivers 602, 604 may be arranged in reverse polarity and/or as a differential sensing. The radial sensor 202 provides an inherently sensitive isolation tool, thereby allowing the identification of isolation regions in the wellbore 106.

Turning to FIG. 6B, in one implementation, the radial sensor 102 includes a configuration 608 having an array of transmit/receive elements 610 that are capable of both transmission and reception. The transmit/receive elements 610 are disposed around the radial sensor 102. Unlike the configuration 600, where the radial sensor 102 is rotated to achieve 360° coverage with the single transmit element 606 and the two receive elements 602, 604, the configuration 608 would achieve 360° coverage without rotation. In another implementation, the configuration 600 may achieve 360° coverage without rotation through sequential combinations of three built up (e.g., one transmission and two receivers with 120° separation).

While FIGS. 6A-6B illustrate the production tube 108 as being substantially concentric relative to the casing 110 and/or the wellbore 106, the radial sensor 202 may be used to determine deviations in the eccentricity of the production tub 108 relative to the casing 110 and/or the wellbore 106.

In one implementation, the cement 114 is substantially concentric and circumferentially symmetrical providing a cumulative receiver output of zero. The transmitted energy received by the receiver 602 is substantially offset by the transmitted energy received by the receiver 604. The receivers 602, 604 can be arranged either with reverse polarity or one acoustic receiver can be subtracted from the other, thereby producing a differential output signal, from which radial symmetry may be determined.

As shown in the example of FIG. 6A, the production tube 108 is substantially concentric relative to the casing 110 and/or the wellbore 106, which forms a substantially circumferentially symmetric gap between the outer wall of the production tube 108 and the inner wall of the casing 110. The radial sensor 202 may be used to determine the eccentricity of the production tube 108 within the casing 110. As eccentricity of the production tube 108 increasing within the casing 110, the differential output signal will increase due to the variation in the gap between the outer wall of the production tube 108 and the inner wall of the casing 110.

Figure 7A:
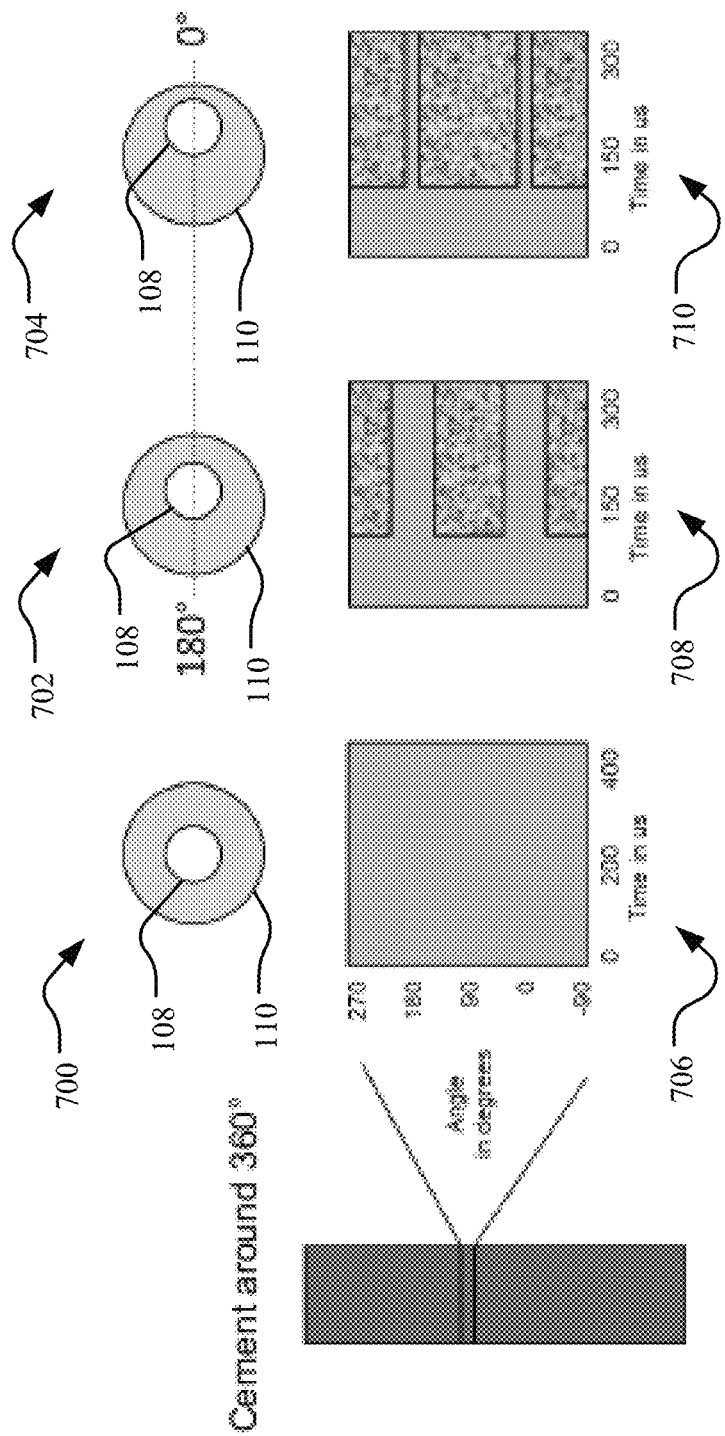
FIG. 7A is a diagrammatic view of detection of eccentricity of a production tubing within a downhole environment.

Turning to FIG. 7A, radial sensor logs 706-710 captured by the radial sensor 202 are illustrated. The radial sensor logs 706-710 correspond to various eccentricity configurations 700-704 of the production tube 108 relative to the casing 110. It will be appreciated that the radial sensor 202 rotates as the data corresponding to the radial logs 706-710 is captured. Each of the radial sensor logs can present a 360° view of the production tube 108 disposed within the casing 110 and/or the wellbore 106 in a downhole environment. The radial sensor logs can be generated to detect isolation regions, as well as eccentricity.

As described herein, the production tube 108 is deployed within the casing 110 formed through at least a portion of the subterranean formation 104 can be oblique and/or eccentric. The radial sensor 202 may be used to determine the eccentricity and/or the obliqueness of the production tube 108 in addition to the presence, thickness, and/or uniformity of the cement 114, and thus determine the radial symmetry of the cement 114.

As can be appreciated from FIG. 7A, the eccentricity configuration 700 includes the production tube 108 being substantially concentric with the casing 110, which produces no output on the radial sensor log 706. The concentric nature of the production tube 108 and the casing 110 in the configuration 700 produces no output on the radial log 706 due to the substantially uniform annulus formed therebetween. On the other hand, the increasing eccentricity of the eccentricity configurations 702-704, generates output in the corresponding radial logs 708-710. As the production tube 108 becomes eccentric along the 0-180 degree axis, symmetry will be displayed as bands of no output, while the asymmetry will show output elsewhere. As the eccentricity increases along the 0-180 degree axis, the symmetry bands will narrow.

While the FIG. 7A illustrates eccentricity with respect to a 0-180 degree axis, it can be appreciated that eccentricity can be experienced on one or more other axes (e.g. 45-135, 90-270, etc.) and would likewise illustrate with symmetry/asymmetry output within the scope of the presently disclosed technology.

Figure 7B:
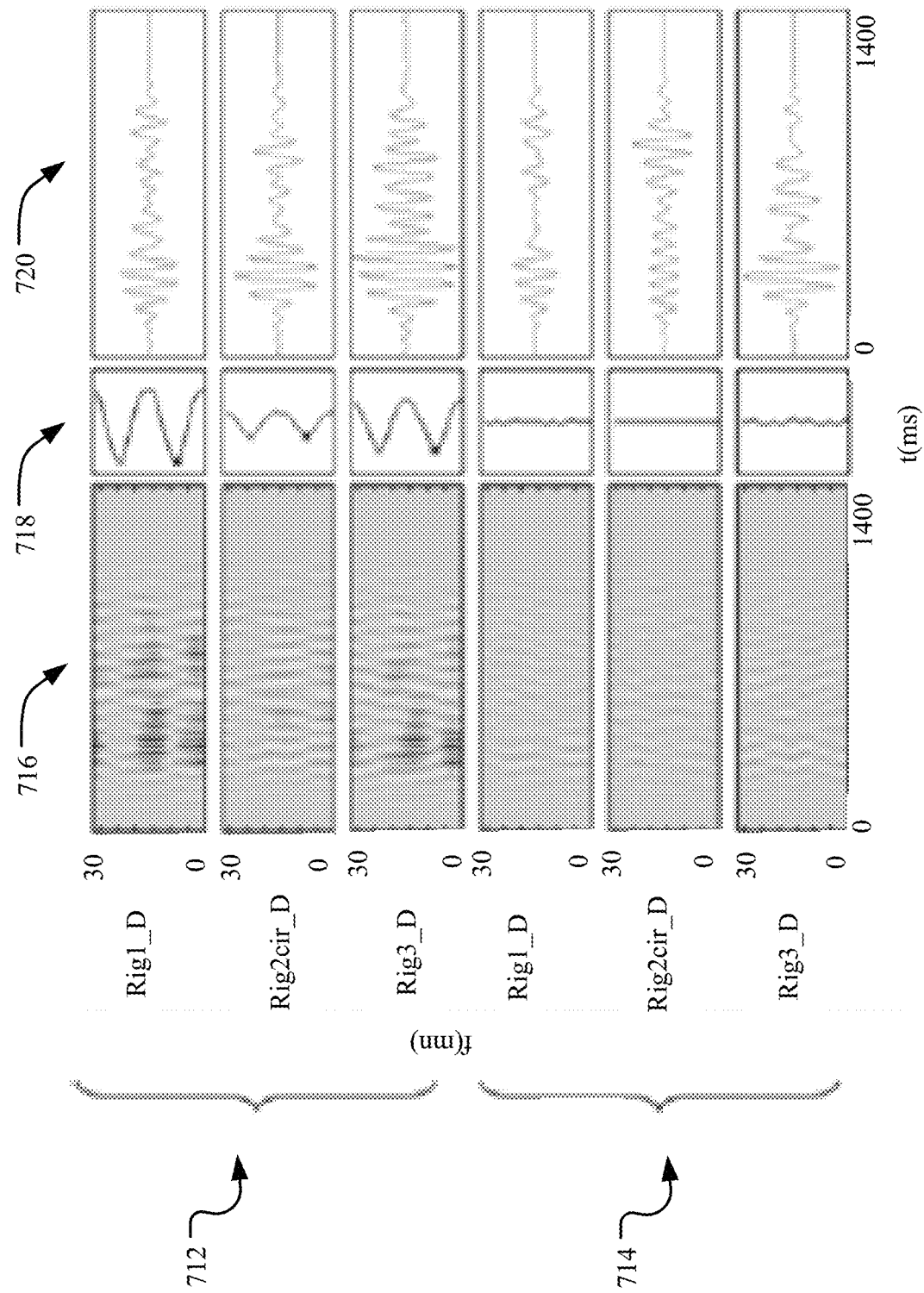
FIG. 7B is a diagrammatic view of radial sensing of an eccentric production tubing and a concentric production tubing within a downhole environment.

Turning to FIG. 7B, the detection of band narrowing and consequently the eccentricity of the production tube 108 may be assisted by convolution techniques. For eccentric configurations 712 and concentric configurations 714, measured results including output 716, convolutions 718, and Null signal 720, are shown. Convolution takes data from a particular point, generates a reverse data set, multiplies the data set and the reverse data set, and sums to generate a value. This process can be repeated at each point on the data set. The convolution can lead to axes of symmetry within the output 716. In other words, the output 716 can be obtained using the radial sensor 202. The output 716 can have a convolution applied thereto for each particular point, thereby identifying axes of symmetry within the output 716.

As can be appreciated in FIG. 7B, the convolutions 718 for each of the eccentric configurations 712 illustrates the axes of symmetry corresponding to the eccentricity of the production tube 108 within the wellbore 106. While the convolutions 718 of the example of FIG. 7B each illustrate the two axes of symmetry (e.g. 0-180 axis), it is within the scope of this disclosure for the convolution to identify any number of axes of symmetry on one or more axes as determined by the eccentricity of the production tube 108 and the relative orientation of the axes.

FIG. 7B further illustrates that the convolutions 718 of the concentric configurations 714 include zero eccentricity, thus perfect symmetry. The convolutions 718 show no identifiable axes of symmetry because the substantially concentric nature of the production tube 108 relative to the wellbore 106 generate symmetry, thus rendering no specific axes of symmetry.

While eccentricity of the production tube 108 is not required to determine a suitable location for isolation, the radial sensor 202 can determine eccentricity to provide an operator further information related to a downhole environment of the wellbore 106. Further, the determination of eccentricity can assist in validating, calibrating, and/or evaluating the acoustic logging tool 102.

Figure 8:
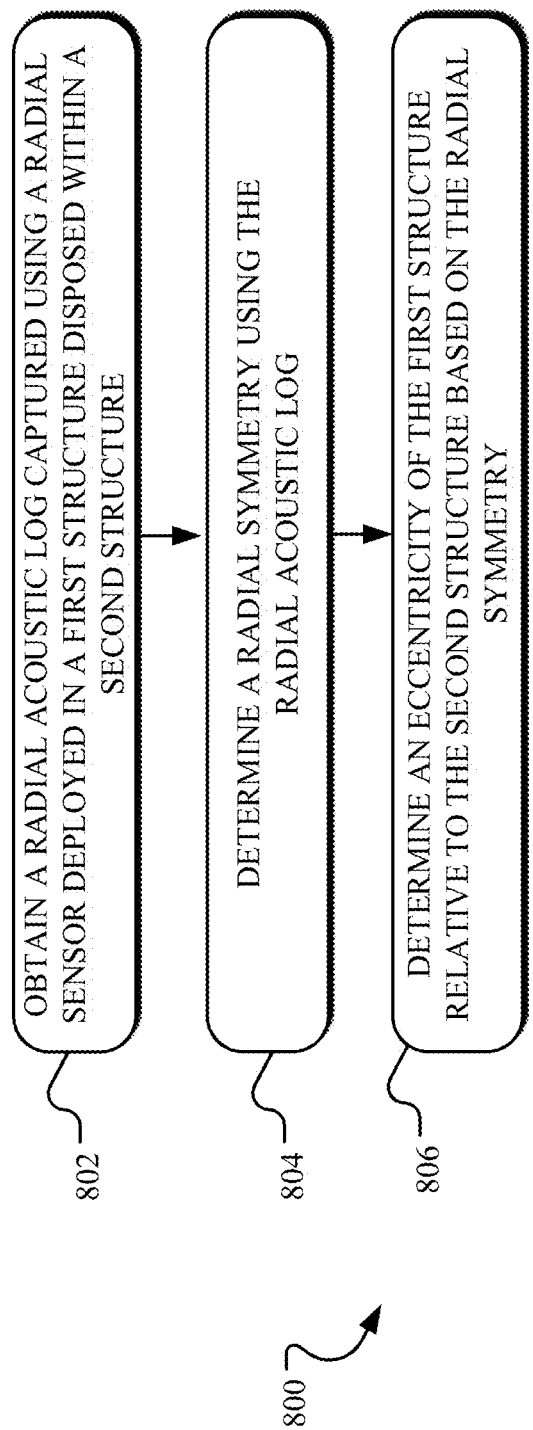
FIG. 8 illustrates example operations for analyzing a subterranean structure.

FIG. 8 illustrates example operations 800 for analyzing a subterranean structure. In one implementation, an operation 802 obtains a radial acoustic log captured using a radial sensor deployed in a first structure disposed within a second structure located in a subterranean formation. The first structure may be a production tube and the second structure may be a casing of a wellbore of the subterranean formation. An operation 804 determines a radial symmetry using the radial acoustic log, and an operation 806 determines an eccentricity of the first structure relative to the second structure based on the radial symmetry.

Figure 9:
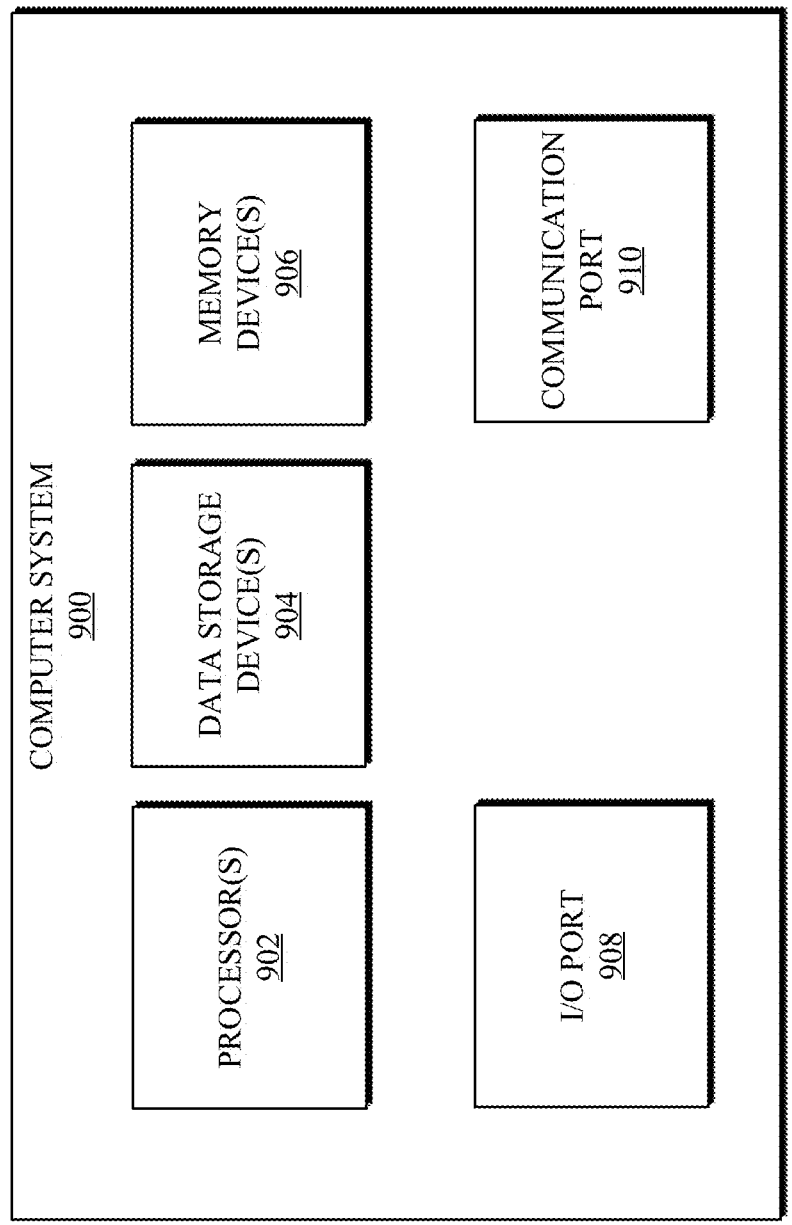
FIG. 9 depicts an example computing system that may implement various systems and methods discussed herein.

Referring to FIG. 9, a detailed description of an example computing system 900 having one or more computing units that may implement various systems and methods discussed herein is provided. The computing system 900 may be applied to the controller 202, data recorder, and/or the like and may be used in connection with processing, as described herein. It will be appreciated that specific implementations of these devices may be of differing possible specific computing architectures not all of which are specifically discussed herein but will be understood by those of ordinary skill in the art.

The computer system 900 may be a computing system is capable of executing a computer program product to execute a computer process. Data and program files may be input to the computer system 900, which reads the files and executes the programs therein. Some of the elements of the computer system 900 are shown in FIG. 9, including one or more hardware processors 902, one or more data storage devices 904, one or more memory devices 908, and/or one or more ports 908-910. Additionally, other elements that will be recognized by those skilled in the art may be included in the computing system 900 but are not explicitly depicted in FIG. 9 or discussed further herein. Various elements of the computer system 900 may communicate with one another by way of one or more communication buses, point-to-point communication paths, or other communication means not explicitly depicted in FIG. 9.

The processor 902 may include, for example, a central processing unit (CPU), a microprocessor, a microcontroller, a digital signal processor (DSP), and/or one or more internal levels of cache. There may be one or more processors 902, such that the processor 902 comprises a single central-processing unit, or a plurality of processing units capable of executing instructions and performing operations in parallel with each other, commonly referred to as a parallel processing environment.

The computer system 900 may be a conventional computer, a distributed computer, or any other type of computer, such as one or more external computers made available via a cloud computing architecture. The presently described technology is optionally implemented in software stored on the data stored device(s) 904, stored on the memory device(s) 906, and/or communicated via one or more of the ports 908-910, thereby transforming the computer system 900 in FIG. 9 to a special purpose machine for implementing the operations described herein. Examples of the computer system 900 include personal computers, terminals, workstations, mobile phones, tablets, laptops, personal computers, multimedia consoles, gaming consoles, set top boxes, and the like.

The one or more data storage devices 904 may include any non-volatile data storage device capable of storing data generated or employed within the computing system 900, such as computer executable instructions for performing a computer process, which may include instructions of both application programs and an operating system (OS) that manages the various components of the computing system 900. The data storage devices 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 906 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 904 and/or the memory devices 906, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 900 includes one or more ports, such as an input/output (I/O) port 908 and a communication port 910, for communicating with other computing, network, or vehicle devices. It will be appreciated that the ports 908-910 may be combined or separate and that more or fewer ports may be included in the computer system 900.

The I/O port 908 may be connected to an I/O device, or other device, by which information is input to or output from the computing system 900. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 900 via the I/O port 908. Similarly, the output devices may convert electrical signals received from computing system 900 via the I/O port 908 into signals that may be sensed as output by a human, such as sound, light, and/or touch. The input device may be an alphanumeric input device, including alphanumeric and other keys for communicating information and/or command selections to the processor 902 via the I/O port 908. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 900 via the I/O port 908. For example, an electrical signal generated within the computing system 900 may be converted to another type of signal, and/or vice-versa. In one implementation, the environment transducer devices sense characteristics or aspects of an environment local to or remote from the computing device 900, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 900, such as, physical movement of some object (e.g., a mechanical actuator), heating or cooling of a substance, adding a chemical substance, and/or the like.

In one implementation, a communication port 910 is connected to a network by way of which the computer system 900 may receive network data useful in executing the methods and systems set out herein as well as transmitting information and network configuration changes determined thereby. Stated differently, the communication port 910 connects the computer system 900 to one or more communication interface devices configured to transmit and/or receive information between the computing system 900 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 910 to communicate one or more other machines, either directly over a point-to-point communication path, over a wide area network (WAN) (e.g., the Internet), over a local area network (LAN), over a cellular (e.g., third generation (3G), fourth generation (4G), or fifth generation (5G)) network, or over another communication means. Further, the communication port 910 may communicate with an antenna or other link for electromagnetic signal transmission and/or reception.

In an example implementation, radial logs, axial logs, impedance information, spectra, characterizations, and software and other modules and services may be embodied by instructions stored on the data storage devices 904 and/or the memory devices 906 and executed by the processor 902.

The system set forth in FIG. 9 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for analyzing a subterranean structure configuration, the method comprising:
obtaining a radial acoustic log at a computing system having one or more processors, the radial acoustic log captured using a radial sensor of an acoustic logging tool deployed within a first structure, the first structure disposed within a second structure in a subterranean environment;
determining, with the one or more processors of the computing system, a radial symmetry using the radial acoustic log; and
determining, with the one or more processors of the computing system, an eccentricity of the first structure relative to the second structure based on the radial symmetry.

2. The method of claim 1, wherein radial sensor rotates within the first structure.

3. The method of claim 1, wherein the first structure is a production tube and the second structure is a casing, the production tube and the casing deployed in a wellbore.

4. The method of claim 1, wherein the eccentricity includes the first structure being concentric relative to the second structure when the radial symmetry includes a zero radial symmetry output.

5. The method of claim 1, wherein the radial sensor includes a set of receivers disposed equidistant from a transmitter along a circumferential direction.

6. The method of claim 5, wherein the radial symmetry is determined using differential sensing between the set of receivers.

7. The method of claim 1, wherein the acoustic logging tool includes an axial sensor configured to capture an axial log.

8. The method of claim 7, wherein an obliqueness between the first structure and the second structure is determined using at least one of the radial acoustic log or the axial log.

9. The method of claim 1, wherein a convolution technique is used to identify axes of symmetry within the radial acoustic log.

10. The method of claim 9, wherein the axes of symmetry correspond to the eccentricity.

11. One or more tangible non-transitory computer-readable storage media storing computer-executable instructions for performing a computer process on a computing system, the computer process comprising:
obtaining a radial acoustic log, the radial acoustic log captured using a radial sensor of an acoustic logging tool deployed within a first structure, the first structure disposed within a second structure in a subterranean environment;
determining a radial symmetry using the radial acoustic log; and
determining an eccentricity of the first structure relative to the second structure based on the radial symmetry.

12. The one or more tangible non-transitory computer-readable storage media of claim 11, wherein radial sensor rotates within the first structure.

13. The one or more tangible non-transitory computer-readable storage media of claim 11, wherein the first structure is a production tube and the second structure is a casing, the production tube and the casing deployed in a wellbore.

14. The one or more tangible non-transitory computer-readable storage media of claim 11, wherein the eccentricity includes the first structure being concentric relative to the second structure when the radial symmetry includes a zero radial symmetry output.

15. The one or more tangible non-transitory computer-readable storage media of claim 11, wherein the acoustic logging tool includes an axial sensor configured to capture an axial log.

16. The one or more tangible non-transitory computer-readable storage media of claim 15, wherein an obliqueness between the first structure and the second structure is determined using at least one of the radial acoustic log or the axial log.

17. The one or more tangible non-transitory computer-readable storage media of claim 11, wherein a convolution technique is used to identify axes of symmetry within the radial acoustic log.

18. The one or more tangible non-transitory computer-readable storage media of claim 17, wherein the axes of symmetry correspond to the eccentricity.

* * * * *

UNITED STATES PATENT AND TRADEMARK OFFICE
CERTIFICATE OF CORRECTION

| | |
|---|---|
| PATENT NO. | : 11,879,323 B2 |
| APPLICATION NO. | : 17/080761 |
| DATED | : January 23, 2024 |
| INVENTOR(S) | : Geoff Steel, Mark Walsh and Stephen John Mayo |

It is certified that error appears in the above-identified patent and that said Letters Patent is hereby corrected as shown below:

In the Claims

In Claim 1, Line 15, "symmetry" is deleted and -- symmetry; wherein the eccentricity includes the first structure being eccentric relative to the second structure when the radial symmetry includes a non-zero radial symmetry output -- is inserted after "radial"

In Claim 11, Line 13, "symmetry" is deleted and -- symmetry; wherein the eccentricity includes the first structure being eccentric relative to the second structure when the radial symmetry includes a non-zero radial symmetry output -- is inserted after "radial"

Signed and Sealed this
Twenty-third Day of September, 2025

John A. Squires
*Director of the United States Patent and Trademark Office*